United States Patent Office 3,156,041
Patented Nov. 10, 1964

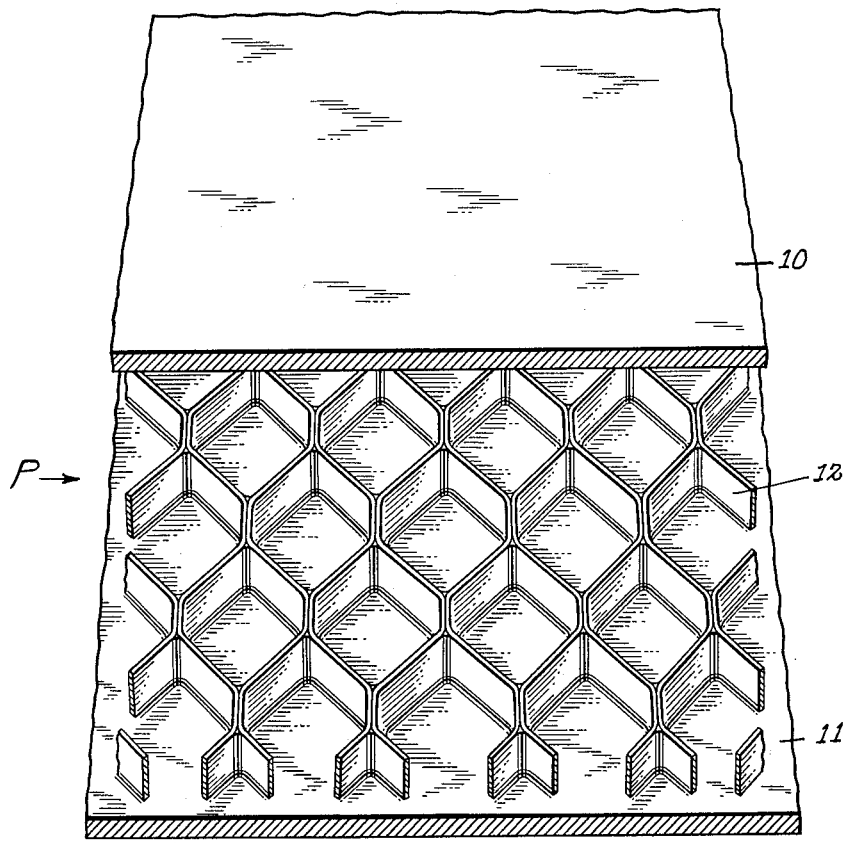

3,156,041
METHOD OF SOLDERING AND BRAZING
STRUCTURAL ELEMENTS
Frank M. Gault, 124 Twin Falls Road, Berkeley
Heights, N.J.
Filed Apr. 18, 1960, Ser. No. 22,903
1 Claim. (Cl. 29—471.1)

This invention relates to the manufacture of lightweight hollow structural elements and it relates particularly to methods of brazing or soldering lightweight hollow structural elements such as, for example, sandwich-type or skin panels for aircraft and the like and to the resulting products.

Sandwich-type panels having a so-called "honeycomb" filler therein are used in high speed jet aircraft and the like. Primary requirements for aircraft panels are light weight and high structural strength. Usually, the honeycomb reinforcement between the sandwich panels for aircraft is formed of strips of metal or foil on the order of .0015 inch in thickness. Stainless steel ordinarily is used, because of its corrosion resistance. The outer skin of the sandwich will ordinarily be between .008 and .012 inch in thickness but the thickness may be greater in heavier loaded panels or for panels used for other purposes than in aircraft. In any event, the sheet metal frequently is so thin that scratching, corrosion or other defects therein will weaken and cause quick failure of the panels.

The elements of the sandwich structure are normally welded or brazed together. Due to the fact that corrosion is undesirable, fluxes are not used in the brazing or welding operations. Inasmuch as fluxes are not used, the elements must be perfectly clean to obtain uniformly welded or brazed joints between the elements. Moreover, the brazing and welding operations of the elements of the panels and the handling must be conducted under such conditions that the presence of moisture is completely avoided; moisture trapped in the sealed honeycomb pockets would prevent the formation of a sound bond and would corrode the metal and joints and cause weakening or failure of the structural element.

At the present time, the sheets of metal and the honeycomb assembly are subjected to a complicated series of cleaning operations including vapor degreasing, cleaning with an alkali cleaner, rinsing to remove the alkali, acid cleaning, rinsing with tap water, spray rinsing with deionized water and drying. Following these cleaning treatments, the cover sheets and the honeycomb core must be handled so that they are kept free of moisture, grease and oil.

In aircraft panels, the upper and lower cover sheets are assembled with a thin, foil-like brazing metal between them and the honeycomb core and with doublers or other elements to reinforce the panel. After assembly, the structural unit is placed in a brazing box which is sealed, evacuated and then filled with an inert gas which is kept in the sealed container during brazing and cooling. In a typical operation, the brazing box is purged of air with dry argon at room temperature. The structural sandwich is then brazed under a 10 to 24 inch mercury vacuum at about 1650° F., is then cooled in an argon atmosphere to about 1400° F. and finally to room temperature and thereafter may be heat treated as may be required.

As indicated above, the principal reason for the extensive cleaning operations and the treatment in an argon atmosphere or under a vacuum is to assure the production of sound joint without the use of fluxes for brazing the parts together, thereby avoiding the entrapment of moisture in the sealed compartments of the honeycomb and corrosion of the product.

In accordance with the present invention, I have provided a method of producing hollow lightweight structures of the type generally referred to above in which a flux may be used to facilitate brazing or soldering of the elements thereof without creating conditions in the finished structural element which would promote the corrosion thereof.

More particularly, in accordance with the invention, I have discovered that a soldering or brazing flux which contains a phosphate or phosphoric acid not only facilitates brazing or soldering but does away with the need for extensive cleaning of the product and brazing or soldering in a vacuum or in the presence of an inert gas. The phosphate in the soldering or brazing flux reacts with the metal to form a metallic phosphate coating thereon which is water-insoluble and protects the underlying metal against corrosion so that any moisture or the like entrapped in sealed compartments in the hollow structure cannot corrode and weaken it after brazing.

Inasmuch as the flux for soldering or brazing contains a compound or compounds which produce the protective phosphate coating, it will be apparent that the involved and expensive cleaning operations heretofore used, as well as brazing under vacuum and/or in the presence of inert gas can be done away with thereby greatly facilitating the manufacture of the structural elements and materially reducing the time involved in their manufacture and their manufacturing costs.

For a better understanding of the present invention, reference may be had to the accompanying drawing in which the single figure shows a portion of a typical honeycomb panel made in accordance with the present invention.

While the invention is particularly applicable to the production of ferrous metal structures, it is equally useful in preparing structural elements from other corrodible materials, such as brass and aluminum.

By way of example of the invention, the production of a honey comb panel P, useful as a skin panel or structural element of an aircraft will be described. The panel P includes upper and lower metal sheets 10 and 11 formed of stainless steel or the like of an appropriate thickness depending upon the use to which the article is to be put. Interposed between the upper and lower panels is a honeycomb core 12 formed of thin strips of metal, such as stainless steel, which are welded together at contact points and are to be brazed or soldered to the upper and lower panels 10 and 11. These strips are of foil-like thinness, e.g., about .0015 inch thick, but they may be somewhat thicker, e.g., .025 of an inch, if the weight of the panel P is not critical.

Reinforcing elements or inserts (not shown) may be provided to strengthen the panel and form thicker areas for reception of fastening elements and the like.

In accordance with the present invention, the sheets 10 and 11 and the honeycomb core 12 are subjected to a degreasing and cleaning operation of conventional type and, after cleaning, are rinsed and dried. The cleaning operation need not be extensive inasmuch as the flux which is used in conjunction with a suitable soldering or brazing metal assures proper conditioning of the surfaces of the core and the sheets to enable strong uniform joints to be obtained. After cleaning the parts, thin sheets of brazing metal of foil-like thickness which have been coated with a suitable brazing flux are interposed between the sheets 10 and 11 and the core 12. The accordance with the invention, the flux will contain phosphoric acid or a phosphate in an amount suitable to react with the ferrous metal and form, as an incident of and following the brazing operation, an iron-phosphate protective coating. When a relatively low temperature soldering or brazing metal, such as a low melting silver solder or a silver-copper-lithium brazing metal is used, a suitable flux may consist, by weight, of 60 parts $KHF_2$, 40 parts $KB_5O_8$, 30 parts $H_2O$ and 25 parts $KH_2PO_4$. For brazing compositions requiring a temperature higher than 1700° F., a suitable flux may consist, by weight, of 90 parts $KB_5O_8$, 10 parts $KHF_2$, 30 parts $H_2O$ and 25 parts $KH_2PO_4$. For imparting prolonged corrosion resistance to the structural members, the proportion of the phosphate or phosphoric acid in the flux should be at least 5% by weight. The proportion of water is variable depending upon the desired fluidity of the flux. Between 25 and 35 parts of water normally will be present. Other components, such as chlorides, commonly used in brazing fluxes, may be present or used instead of fluorides and borates.

The assembly of the sheets 10 and 11 and the core 12 and the interposed sheets of brazing metal are clamped together in any suitable way and introduced directly into a brazing chamber which may be heated by gas, electricity or the like to raise the assembly to a temperature suitable for melting the brazing metal and thereby uniting the sandwich to form the hollow core structure. It will be apparent that during the initial stages of the heating operation, the moisture in the flux will be evaporated but nevertheless a small amount of moisture will, in most instances, be trapped in the compartments of the completed sandwich panel. The flux on the surfaces of the sheets of brazing metal conditions the surfaces to be bonded by brazing and a surface coating of a corrosion resistant metal is formed on the panels 10, 11 and the core 12 so that any moisture which is entrapped in the compartments is ineffective to cause corrosion either of the metal elements themselves or the brazing metal at the joints between the honeycomb core 12 and the sheets 10 and 11.

When making composite structural elements from nonferrous metals, such as brass or aluminum, it will be understood that different soldering or brazing metals may be used together with appropriate fluxes, containing phosphoric acid, phosphate compounds such as $KH_2PO_4$. Fluxes for brazing aluminum should include a fluoride as well as the phosphate. The term "phosphate" as used hereinafter shall include phosphoric acid.

It will be understood that from the preceding description that those phases of the prior treatments which were particularly time consuming and difficult are completely eliminated in the present process. Thus, there is no need to place the assembled sandwich in a brazing box and purge all of the air and the moisture from the box prior to and during the brazing operation. While an inert atmosphere may be maintained in the brazing furnace in order to avoid oxidation of the elements when practicing the present invention, there is no reason for maintaining a vacuum therein in order to exclude moisture from the elements.

It will be understood that the process embodying the present invention may be applied to many other structural elements than sandwich panels of the type described. It may be used in radiator cores, box girder elements and in many other fields wherein sealed or blind joints are present and which are subject to corrosion and failure when formed of thin lightweight metal on the order of that described above. Accordingly, the method and product described above should be considered as illustrative and not as limiting the scope of the following claim.

I claim:

A method of making hollow structural members, comprising cleaning the surfaces of ferrous metal sheets having a thickness not substantially exceeding .025 inch, assembling with and between said sheets a honeycomb reinforcement of ferrous metal strips having a thickness of up to about .025 inch, said strips forming open-ended compartments therebetween of substantially uniform shape, applying to said sheets and reinforcement a brazing metal and a brazing flux consisting essentially of 10 to 60 parts of a fluoride, 40 to 90 parts of a borate, at least 5% of a phosphate and the remainder water, all parts being by weight, heating the assembled sheets and reinforcement to flux their internal surfaces and react said flux with said sheets to provide the internal surfaces of said member with a corrosion-resisting phosphate coating and melt said brazing metal to braze said sheets to said reinforcement, and cooling said assembly to solidify said brazing metal and unite said sheets and reinforcement and form a structural member containing a plurality of mutually reinforcing hollow sealed compartments.

References Cited by the Examiner

UNITED STATES PATENTS

| | | | |
|---|---|---|---|
| 2,171,041 | 8/39 | Michel | 29—495 |
| 2,684,312 | 7/54 | Wasserman | 148—26 X |
| 2,720,949 | 10/55 | Pajak | 189—34 |
| 2,816,355 | 12/57 | Herman | 189—34 |
| 2,900,713 | 8/59 | Young | 189—34 |
| 2,987,817 | 6/61 | Kozlik | 29—496 |

BENJAMIN BENDETT, *Primary Examiner.*

JOEL REZNEK, JACOB L. NACKENOFF, *Examiners.*